(12) United States Patent
Ladi et al.

(10) Patent No.: US 8,435,324 B2
(45) Date of Patent: May 7, 2013

(54) CHEMICAL AGENTS FOR LEACHING POLYCRYSTALLINE DIAMOND ELEMENTS

(75) Inventors: Ram L. Ladi, Tomball, TX (US); Carl Edward Wells, Richland Hills, TX (US); Bhupinder Kumar Kataria, Spring, TX (US); Stephen W. Almond, Spring, TX (US)

(73) Assignee: Halliburton Energy Sevices, Inc., Houston, TX (US)

( * ) Notice: Subject to any disclaimer, the term of this patent is extended or adjusted under 35 U.S.C. 154(b) by 5 days.

(21) Appl. No.: 13/168,733

(22) Filed: Jun. 24, 2011

(65) Prior Publication Data

US 2012/0152064 A1    Jun. 21, 2012

Related U.S. Application Data

(60) Provisional application No. 61/425,579, filed on Dec. 21, 2010.

(51) Int. Cl.
*C22B 3/06*    (2006.01)

(52) U.S. Cl.
USPC .......................................... 75/743; 423/150.1

(58) Field of Classification Search ...................... 75/743
See application file for complete search history.

(56) References Cited

U.S. PATENT DOCUMENTS

| | | | |
|---|---|---|---|
| 2,419,240 A | 4/1947 | Wilson | 23/119 |
| 2,775,517 A | 12/1956 | Mancke et al. | 75/1 |
| 3,022,243 A | 2/1962 | Anderson | 204/196 |
| 3,141,746 A | 7/1964 | De Lai | 51/307 |
| 3,147,542 A * | 9/1964 | Boeckeler | 428/457 |
| 3,430,804 A | 3/1969 | Bernas | 220/63 |
| 4,218,240 A * | 8/1980 | Gingerich et al. | 75/365 |
| 4,224,308 A | 9/1980 | Gaffar et al. | 424/49 |
| 4,288,248 A | 9/1981 | Bovenkerk et al. | 75/226 |
| 5,346,090 A | 9/1994 | Purohit et al. | 220/410 |
| 5,848,348 A | 12/1998 | Dennis | 419/5 |
| 6,258,139 B1 | 7/2001 | Jensen | 51/307 |
| 6,544,308 B2 | 4/2003 | Griffin et al. | 51/309 |

(Continued)

FOREIGN PATENT DOCUMENTS

| | | |
|---|---|---|
| EP | 1960158 | 3/2009 |
| GB | 2422623 | 8/2008 |
| JP | 2009191328 | 8/2009 |
| WO | WO 2010/104793 | 9/2010 |

OTHER PUBLICATIONS

International Search Report and Written Opinion; Application No. PCT/US2011/066362; pp. 15, Jun. 15, 2012.

(Continued)

*Primary Examiner* — George Wyszomierski
*Assistant Examiner* — Tima M McGuthry Banks
(74) *Attorney, Agent, or Firm* — Baker Botts L.L.P.

(57) ABSTRACT

The disclosure provides to a PDC element protective system including a mask configured to protect a non-leached portion of a leached polycrystalline diamond compact (PDC) element during a leaching process. The mask may be formed from or coated with polytetrafluoroethylene (PTFE). The disclosure also provides a leaching system containing such a mask and a leaching vessel as well as methods of using the protective and leaching systems. The disclosure further provides a Lewis acid-based leaching agent and methods of its use. Finally, the disclosure provides a method of recycling a PDC or carbide element using a Lewis acid-based leaching agent.

16 Claims, 13 Drawing Sheets

U.S. PATENT DOCUMENTS

| | | | |
|---|---|---|---|
| 6,726,823 B1 | 4/2004 | Wang et al. | 205/80 |
| 6,749,033 B2 | 6/2004 | Griffen et al. | 175/428 |
| 7,350,601 B2 | 4/2008 | Belnap et al. | 175/434 |
| 7,608,333 B2 | 10/2009 | Eyre | 428/408 |
| 7,757,792 B2 * | 7/2010 | Shamburger | 175/434 |
| 7,972,395 B1 * | 7/2011 | Dadson | 51/293 |
| 8,216,677 B2 | 7/2012 | Mukhopadhyay et al. | 428/408 |
| 2005/0044800 A1 | 3/2005 | Hall et al. | 51/307 |
| 2005/0139397 A1 | 6/2005 | Achilles et al. | 175/434 |
| 2005/0214184 A1 | 9/2005 | Chambers et al. | 422/193 |
| 2006/0162969 A1 | 7/2006 | Belnap et al. | 175/433 |
| 2007/0046120 A1 | 3/2007 | Cooley et al. | 310/90.5 |
| 2007/0082229 A1 * | 4/2007 | Mirchandani et al. | 428/698 |
| 2007/0169419 A1 | 7/2007 | Davis et al. | 51/293 |
| 2007/0181348 A1 | 8/2007 | Lancaster et al. | 175/432 |
| 2008/0028839 A1 | 2/2008 | Vail | 73/64.56 |
| 2008/0085407 A1 | 4/2008 | Cooley et al. | 428/336 |
| 2008/0142272 A1 | 6/2008 | Hall et al. | 175/374 |
| 2008/0185189 A1 | 8/2008 | Griffo et al. | 175/433 |
| 2008/0210066 A1 | 9/2008 | Arterburn et al. | 83/22 |
| 2009/0263308 A1 | 10/2009 | Hall et al. | 423/446 |
| 2010/0011673 A1 | 1/2010 | Shamburger | 51/309 |
| 2010/0012391 A1 | 1/2010 | Shamburger | 175/434 |
| 2011/0023375 A1 | 2/2011 | Sani et al. | 51/297 |
| 2011/0056141 A1 | 3/2011 | Miess et al. | 51/295 |
| 2012/0152064 A1 | 6/2012 | Ladi et al. | 75/743 |

OTHER PUBLICATIONS

Invitation to Pay Additional Fees and Partial Search Report; Application No. PCT/US2011/066362; pp. 7, Apr. 3, 2012.
U.S. Appl. No. 13/168,172; pp. 42, Jun. 24, 2011.
U.S. Appl. No. 13/168,712; pp. 35, Mar. 23, 2012.
U.S. Appl. No. 13/168,712; pp. 31, Jul. 6, 2012.
U.S. Appl. No. 13/168,755; pp. 42, Jun. 24, 2011.
U.S. Appl. No. 13/168,755; pp. 43, Aug. 14, 2012.

* cited by examiner

PRIOR ART

PRIOR ART

PRIOR ART

CHEMICAL AGENTS FOR LEACHING POLYCRYSTALLINE DIAMOND ELEMENTS

PRIORITY CLAIM

The current application claims priority under 35 U.S.C. §119(e) to U.S. Provisional Patent Application Ser. No. 61/425,579, filed Dec. 21, 2010 and titled "Chemical Agents and Protective System for Leaching Polycrystalline Diamond Elements and for Recovery of Leached Materials," incorporated by reference herein in its entirety.

TECHNICAL FIELD

The current disclosure relates to particular Lewis acid-based chemical agents that may be used to leach catalysts, such as Group VIII metals, from polycrystalline diamond compact (PDC) elements, such as cutters for earth-boring drill bits. The disclosure further relates to protective systems that may be used with these or other chemical agents during the leaching process to allow exposure of certain portions of a PDC element to a leaching agent, while protecting other portions of the element from the leaching agent. The disclosure further includes methods of recycling PDC and carbide elements and recovering leached catalysts.

BACKGROUND

Various industrial elements benefit from the inclusion of a polycrystalline diamond compact (PDC), which may, for example, increase the thermal or abrasion resistance of the element or provide other benefits. The PDC portion of an element is typically formed by applying small diamond particles on the surface of a substrate, which typically forms the main body of the element. A catalyst may be applied with the diamond particles or, more typically, is present in the substrate and migrates out of the substrate during PDC formation. The diamond particles and substrate are subjected to extreme temperature and pressure, causing the diamonds to fuse together to form a generally continuous and physically solid matrix, the PDC. In this matrix there are substantial direct diamond-to-diamond bonds. After formation, the catalyst materials remain interspersed in spaces in the PDC matrix. The PDC is also bonded to the substrate in such a way that it will stay in place on the substrate when the PDC element is in use.

Typical catalysts include Group VIII metals, such as Cobalt (Co), Nickel (Ni), and Iron (Fe), and alloys thereof. These catalysts remain trapped within the diamond matrix when the PDC is formed. Although these catalysts can sometimes confer benefits to the PDC, such as improved mechanical strength, they can confer detrimental properties. For example, all of these metals have a much higher coefficient of expansion (tendency to expand when heated) than diamond such that, if the PDC element heats up during use, the metals may heat up and expand much faster than the diamond matrix, causing problems such as spalling, delamination, or conversion to graphite and ultimate failure of the PDC and the element as whole. These and other problems are described in UK Patent GB 2,422,623. Presence of the catalyst may also result in additional problems as well. As a result of detrimental effects of the catalyst, it is very often desirable to remove all or some of the catalyst material from the PDC.

Removal of the catalyst is typically accomplished using either an electrochemical or a chemical process. In chemical processes, referred to as leaching, strong acids, such as aqua regia (one part nitric acid, three parts hydrochloric acid), or caustic materials, such as NaOH, KOH, or halogen gasses are used to remove the catalyst from the diamond layer. Although some processes using these materials take place at room temperature, in other examples temperatures are elevated to as high as 800° C. Some processes also employ pressure vessels. Example processes are described in EP 1 960 158, GB 2,422,623, U.S. Pat. No. 6,749,033, U.S. Pat. No. 6,544,308, US 2007/0169419, U.S. Pat. No. 4,224,308, US 2005/0139397, US 2007/0181348, U.S. Pat. No. 7,608,333, and U.S. Pat. No. 4,288,248, although various other examples also exist.

Not only are such leaching processes generally extremely dangerous for a number of reasons, they also pose difficulties in protecting the portions of the element not to be leached. Control of the where the PDC element is leached may be important for at least three reasons. First, as noted above, the presence of the catalyst in the PDC does confer some advantages. As a result, it may be undesirable or not helpful to remove it from certain areas of the PDC, such as regions that are not exposed to such extreme heat or that benefit from the mechanical strength conferred by the catalyst. Second, more commonly, the substrate, which forms the bulk of the element, is typically made of a material whose resistance to harsh leaching conditions pales in comparison to that of the diamond matrix. Accordingly, exposure of the substrate to the leaching materials may cause serious damage to the substrate, often rendering the PDC element as a whole useless. Third, in some elements the presence of the catalyst in the PDC layer near the substrate is useful in maintaining the interface between the substrate and the PDC layer so that the PDC layer does not separate from the substrate during use of the element. It may therefore be important to protect the interface region from the leaching material.

Various systems for protecting non-leached portions of a PDC element include encasing the PDC element in a protective material, then removing it from the regions to be leached, coating the portion of the element to not be leached, and placing a physical cup around the protected portion then sealing the cup with an O-ring seal. Example protective systems include U.S. Pat. No. 7,757,792, U.S. Pat. No. 4,288,248, U.S. Pat. No. 7,608,333, and EP 1 960 158, although various other examples of proactive systems also exist. These systems tend to suffer from at least two detriments. First, many of them are not reusable and thus waste the protective materials. Due to the harsh nature of current leaching conditions, even reusable protective systems are often damaged or become unreliable after a small number of uses. Second, wicking of the leaching agent along the edges of current systems due to capillary action remains a problem. This can allow the leaching agent to reach areas of the element that should not be leached. At the very least this leads to unreliable leaching and in many instances, particularly if the leaching agent reaches the interface region or substrate, it can destroy the entire element.

Overall, current leaching technology would benefit from the development of less dangerous leaching agents and processes. It would also benefit from better protective systems, particularly systems that are more reliable and involve less waste.

As noted above, PDC elements and used leaching agents contain Group VIII metals. Although some Group VIII metals, such as Iron, are relatively safe and inexpensive, others, such as Cobalt, are highly toxic and costly. Accordingly, there is a need to recover and recycle Group VIII metals from PDC elements or other elements containing these metals, such as carbide elements, and from used leaching agents.

SUMMARY

According to one embodiment, the disclosure relates to a PDC element protective system including a mask configured to protect a non-leached portion of a leached polycrystalline diamond compact (PDC) element during a leaching process. The mask may be formed from or coated with polytetrafluoroethylene (PTFE).

According to a second embodiment, the disclosure provides a PDC element leaching system including a mask configured to protect a non-leached portion of a leached polycrystalline diamond compact (PDC) element during a leaching process and a leaching vessel configured to contain the mask and PDC element during the leaching process. The mask may be formed from or coated with polytetrafluoroethylene (PTFE).

According to a third embodiment, the disclosure provides a method of leaching a PDC element by inserting the PDC element into a mask formed from or coated with polytetrafluoroethylene (PTFE), placing the PDC element and mask into a leaching vessel, leaching at least one catalyst from the PDC element, removing the PDC element and mask from the leaching vessel, and removing the PDC element from the mask.

According to a fourth embodiment, the disclosure provides an agent for leaching a Group VIII metal from a PDC element, the leaching agent including ferric chloride ($FeCl_3$), cupric chloride ($CuCl_2$), and optionally hydrochloric acid (HCl), or nitric acid ($HNO_3$), solutions thereof, and combinations thereof.

According to a fifth embodiment, the disclosure provides a method of leaching a PDC element including placing the PDC element containing a Group VIII metal and a protective system protecting a non-leached portion of the PDC element in a Lewis acid-based leaching agent including ferric chloride ($FeCl_3$), cupric chloride ($CuCl_2$), and optionally hydrochloric acid (HCl), or nitric acid ($HNO_3$), solutions thereof, and combinations thereof, and leaching a part of the Group VIII metal from the PDC element to a leaching depth.

According to a sixth embodiment, the disclosure provides a method of recycling a PDC or carbide element by leaching a desired amount of Group VIII metal from the PDC or carbide element containing the Group VIII metal using a Lewis acid-based leaching agent including ferric chloride ($FeCl_3$), cupric chloride ($CuCl_2$), and optionally hydrochloric acid (HCl), or nitric acid ($HNO_3$), solutions thereof, and combinations thereof, solutions thereof, and combinations thereof to form a Lewis acid/Group VIII metal solution, removing any solid remains of the PDC or carbide element from the Lewis acid/Group VIII metal solution, adjusting the pH of the Lewis acid/Group VIII metal solution to cause precipitation of the Group VIII metal, and collecting the precipitated Group VIII metal.

BRIEF DESCRIPTION OF THE DRAWINGS

A more complete understanding of the present embodiments and advantages thereof may be acquired by referring to the following description taken in conjunction with the accompanying drawings, in which.

DETAILED DESCRIPTION

The current disclosure relates to leaching agents and methods as well as leaching protection systems and methods that may be used in the leaching of catalysts from PDC elements. Although these technologies may be employed in the formation of any PDC element, in particular embodiments they may be used with cutter elements. More particularly, they may be employed in the formation of cutter elements for use on earth-boring drill bits.

PDC elements treated by the leaching technologies described herein may additionally be formed in any manner so long as the PDC elements contain a catalyst including a Group VIII metal catalyst or a chemically similar metal catalyst to be leached from the PDC. Furthermore, although the current disclosure focuses on polycrystalline diamond, in further embodiments, it may be used with other similar technologies in which crystals are bonded using a Group VIII or chemically similar metal catalyst. For example, it may be used with polycrystalline cubic boron nitride (CBN).

Finally, various embodiments of this disclosure may be used in conjunction. For example, the protective systems may be used in conjunction with the leaching agents, from which the Group VIII metals may be recycled using the recycling methods of the disclosure.

Protection Systems and Methods

According to a first aspect, the disclosure relates to protective systems and methods for use in protecting non-leached portions of PDC elements. These protective systems and methods may be used in conjunction with or separate from the leaching agents and methods or the recycling methods also described herein.

Figure 1:
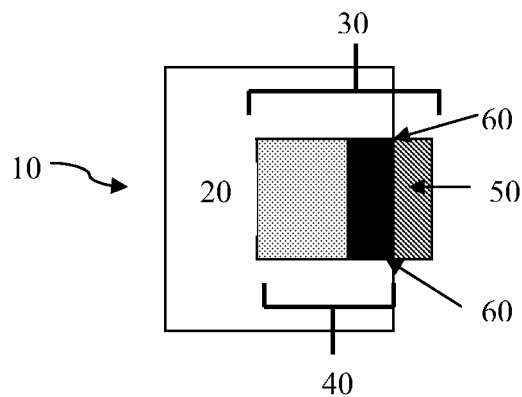
FIG. 1 provides a cross-sectional view of a protective system surrounding a PDC element according to an embodiment of the current disclosure.

According to one embodiment, shown in FIG. 1, protective system 10 may include mask 20. During use, PDC element 30 may be inserted into mask 20 so that protected portion 40 is covered by mask 20, while leached portion 50 remains outside of mask 20.

According to a specific embodiment, mask 20 may be formed from polytetrafluoroethylene (PTFE). The PTFE may be unfilled or filled. In other embodiments, the mask may be formed from related organic polymers, such as other fluoropolymers or fluoroplastics. Filled PTFE may be filled with one or more of glass, molybdenum sulfide, bronze, acetal, carbon, such as graphite or carbon nanofibers, metal, metal oxides, mica, polyphenylene sulfide, and ceramic fillers, such as $BaWO_4$. Filled PTFE may also be Rulon®. Rulon® is a registered trademark of Saint-Gobain Performance Plastics Corporation (Paris, France). The precise chemical composition of Rulon® is not publicly available. Another filled PTFE may be Amilon™, a graphite. glass, molybdenum sulfide, or carbon filled PTFE made by Plastomer Technologies (Houston, Tex.). The precise chemical composition of Amilon™ is also not publicly available. Fillers are typically added to PTFE to improve one or more of its properties. Accordingly, appropriate fillers for filled PTFE used in mask 20 may be identified by adding the filler to PTFE, forming a mask from it, and testing the mask for the desired property or for its general ability to protect non-leached portion 40. Such tests may be performed under actual leaching conditions or approximate conditions. Similar tests may be used to identify other suitable fluoropolymers or fluoroplastics. Some suitable tests are provided in the Examples herein.

Without limiting the mechanism of the invention, PTFE may function well as a mask material due to its resistance to chemical reaction with acidic and caustic substances. The strong Carbon-Fluorine bond in PTFE allows Fluorine to form a non-reactive sheath surrounding the carbon chain. PTFE is also highly crystalline, making it difficult to dissolve. At present, there is no known solvent for PTFE. This general-non-reactivity of PTFE may allow mask 20 to withstand leaching process conditions and to be reused multiple times. Furthermore, mask 20 may be able withstand leaching conditions for long periods of time or at high temperature or pressure. In certain embodiments, other fluoropolymers or fluoroplastics selected for use as mask 20 may have a similarly low chemical reactivity with leaching agents and low solubility.

Also without limiting the mechanism of the invention, PTFE may additionally function well as a mask material due to its low wetting properties. PTFE has a wetting angle of 0, which means that water and aqueous solutions have virtually no tendency to move along PTFE via capillary action. In the context of the current disclosure, this means that leaching agents effectively do not wick into the space between mask 20 and protected portion 40 of PDC element 30. Other fluoropolymers or fluoroplastics selected for use as mask 20 may similarly have a wetting angle of near zero.

Mask 20 may be formed by processing the protective material to the desired configuration. In one embodiment, PTFE may be processed by heating granules of it to above 325° C., at which point it becomes a self-supporting gel that may be pressed, extruded, or sintered. In general, PTFE may be cut, bored or machined to very close tolerances. In selected embodiments, rather than being made entirely of PTFE, mask 20 may merely be coated entirely or in part with PTFE or it may contain a PTFE portion.

Figure 2:
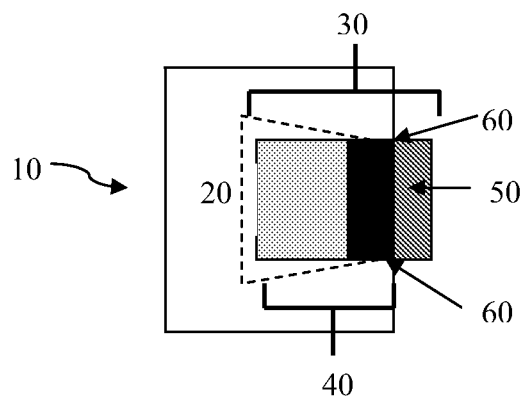
FIG. 2 provides an alternative cross-sectional view of a protective system surrounding a PDC element according to an embodiment of the current disclosure.

Mask 20 may have an interior cavity, as shown in FIG. 1, that generally conforms to the shape of PDC element 30. Due to the low wetting angle of PTFE (or other low wetting angle protective materials), mask 20 may alternatively have an interior cavity, as shown in FIG. 2, that is larger than the dimensions of PDC element 30. In such an embodiment, only contact band 60 may conform to the shape of PDC element 30. Due to the nearly complete absence of capillary action of water on PTFE, only a small, close-fitting contact band may be sufficient to substantially prevent the leaching agent from reaching protected portion 40. Furthermore, the high resilience of PTFE may allow the contact band 60 to fit very closely to PDC element 30 and, in certain embodiments, to conform to the surface of PDC element 30. Contact band 60 may also be formed to precise tolerances, enhancing its ability to interface with PDC element 30 in a manner to form a seal and substantially prevent wicking of the leaching agent. In certain embodiments, the size difference between the inner diameter of contact band 60 and the outer diameter of the region of PDC element 30 contacted by contact band 60 may be less than 100 microns. In particular it may be between negative 7 microns and positive 95 microns.

In one particular embodiment, not shown, contact band 60 may be formed from PTFE or other protective material and the exterior of mask 20 may be coated with PTFE or other protective material, but the core of mask 20 may be formed from another material, which optionally may not be coated in the interior cavity.

The use of a larger interior cavity in mask 20 as shown in FIG. 2 may offer various advantages, such as use of less PTFE or other protective material or greater ease of removal of PDC element 30 from mask 20 after leaching. It is noted, however, that due to the low coefficient of friction of PTFE, neither insertion nor removal of PDC element 30 into or out of mask 20 tends to require substantial force. In most instances, PDC element 30 may be inserted or removed by hand.

PDC element 30 may be any type of element to be leached, including a cutter as shown in FIGS. 1 and 2. Leached portion 50 may typically be formed entirely of PDC. Protected, non-leached portion 40 may include some PDC, particularly PDC located at the interface of the PDC and substrate, and may also typically include the substrate. According to particular embodiments, the substrate may be a carbide substrate, such as tungsten carbide (WC).

Figure 3:
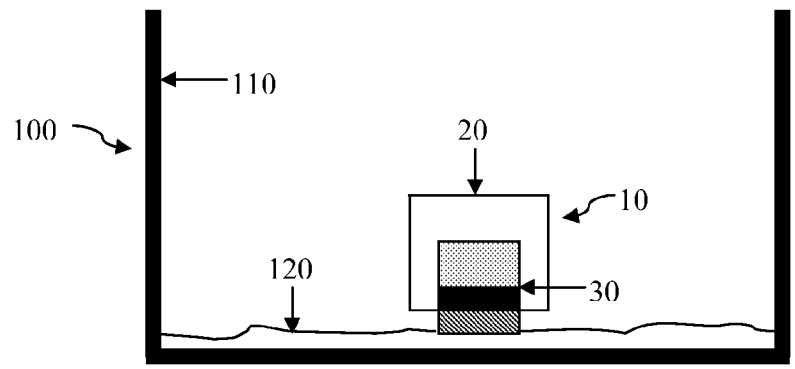
FIG. 3 provides a cross-sectional view of a leaching system in use with a PDC element according to an embodiment of the current disclosure.

In a further embodiment, shown in FIG. 3, protective system 10 may be used in conjunction with leaching system 100. Leaching system 100 may include protective system 10 as well as leaching vessel 110, in which mask 20 and PDC element 30 are placed during leaching of PDC element 30. Leaching vessel 110 may further contain leaching agent 120. In specific embodiments leaching vessel 110 may include an acid containment vessel, which in a more specific embodiment may be a pressure vessel. Leaching agent 120 may be any chemical leaching agent. In particular embodiments, it may be a leaching agent as described herein.

Leaching system 100 may include devices other than mask 20 made from or coated with PTFE or other protective material. Such other devices include, but are not limited to, leaching vessel 110 as well as tongs or other devices for handling the PDC element or containing the leaching agent.

Figure 4:
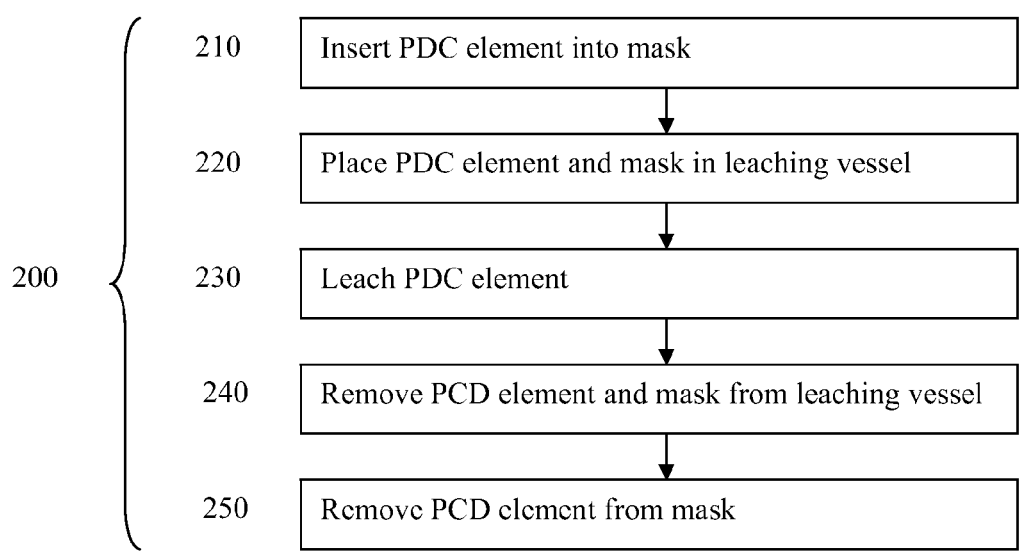
FIG. 4 provides a flow chart of a leaching method according to an embodiment of the current disclosure.

FIG. 4 illustrates a method 200 of leaching a PDC element using the protective system described above. In step 210 a PDC element is inserted into a mask made of PTFE or other protective material. In some embodiments, the PDC element may be inserted by hand. In other embodiments, it may be inserted by an automated system, such as a robotic system. In step 220 the PDC element and mask are placed in a leaching vessel. In this step, the PDC element and mask may be first placed in a leaching vessel and then the leaching agent may be added, or the leaching agent may be added to the leaching vessel before the PDC element is placed in the leaching vessel. This step may also be performed by hand or using an automated system, such as a robotic system. When the Lewis acid leaching agents described herein, such as ferric chloride, are used, it may be particularly safe to perform this step by hand. Other potential leaching agents include, but are not limited to, aqua regia, hydrochloric acid, NaOH, KOH, or halogen gasses. The leaching process may be aided by stirring the leaching agent or otherwise agitating it, for example by ultrasonic methods, vibrations, or tumbling.

Next, the PDC element is leached in step 230. Leaching may take place over a time span of a few hours to a few months. In particular embodiments, it may take less than one day (24 hours), less than 50 hours, or less than one week. Leaching may be performed at room temperature or at a lower temperature, such as as low as 10° C., or at an elevated temperature, such as up to 800° C. The duration and conditions of the leaching step may be determined by a variety of factors including, but not limited to, the leaching agent used, the depth to which the PDC element is leached, and the percentage of catalyst to be removed from the leached portion of the PDC element. In various embodiments, the leaching depth may be less than 0.05 mm, less than 0.1 mm, less than 1 mm, less than 2 mm, or less than 3 mm. In various embodiments, at least 85%, at least 90%, at least 95%, or at least 99% of the catalyst may be removed to the leaching depth from the leached portion of the PDC element. The leaching depth and amount of catalyst removed may be selected based on the intended use of the PDC element.

In step 240, the PDC element and mask are removed from the leaching vessel. This may occur prior to or after removal of the leaching agent from the leaching vessel. After removal, the PDC element may optionally be washed, cleaned, or otherwise treated to remove or neutralize residual leaching agent. Finally, in step 250, the PDC element is removed from the mask. All of these steps may also be performed by hand or using an automated system, such as a robotic system. In embodiments where it is safe to place the PDC element and mask into the leaching agent by hand, it may also be safe to remove them by hand and to perform any washing, cleaning, or treatment by hand.

In a further embodiment, the mask may be reused in the same process one or more additional times. In a particular embodiment, it may be reused at least twenty times.

Leaching Agents and Methods

According to a second aspect, the disclosure relates to leaching agents and methods of employing such agents to remove all or part of the catalyst form a PDC element. These leaching agents and methods may be used in conjunction with or separate from the protective systems and methods or the recycling methods also described herein.

According to one embodiment, the leaching agent may be a Lewis acid, meaning that it is readily able accept an electron pair. The Lewis acid may be selected so that it is able to react sufficiently with the catalyst to remove it from the leached portion of a PDC element. Not all Lewis acids may be able to achieve sufficient reaction with and removal of the catalyst.

In particular, the Lewis acid it may be selected to be able to remove a desired amount of catalyst to a desired depth in a given time period. In particular embodiments, the amount of catalyst removed to the desired depth may be 85%, 90%, 95%, or 99%. The depth may be less than 0.05 mm, 0.1 mm, 1 mm, 2 mm, or 3 mm. The time period may range from a few hours to a few months. Particularly, it may be less than one day (24 hours) or less than one week.

In certain embodiments, the leaching agent may not be a strong Bronstead acid, meaning that it is not a strong proton donor. In particular, it may be such a poor Bronstead acid that it does not result in burns when the skin is exposed to it.

In particular embodiments, the Lewis acid may be a chlorine-based acid, such as, but not limited to certain metal chlorides, such as ferric chloride ($FeCl_3$) or cupric chloride ($CuCl_2$), solutions thereof, and mixtures thereof. The Lewis acid may be combined with a Bronstead acid, such as nitric acid ($HNO_3$), hydrochloric acid, (HCl), or aqua regia. Certain Lewis acid-Bronstead acid combinations, such as $CuCl_2$ combined with HCl, may be able to leach the catalyst more quickly or thoroughly than either acid alone.

In certain embodiments this leaching agent may be reusable up to five or ten times. When a used leaching agent is employed, the duration of the leaching process may be increased.

One may evaluate the suitability of other Lewis acids as a leaching agent by carrying out a leaching assay to determine if the desired properties in the PDC element may be obtained after leaching. One may evaluate how many times the leaching agent may be reused by employing similar techniques. Some suitable tests are provided in the Examples herein.

In a particular embodiment, the leaching agent may be a ferric chloride solution containing between 0.5 and 50 g of ferric chloride, more particularly up to 5 g, 10 g, 20 g, 30 g, or 40 g of ferric chloride, in 100 mL water. This solution may also contain up to 50% by volume hydrochloric acid (HCl), nitric acid ($HNO_3$) or aqua regia.

Figure 5:
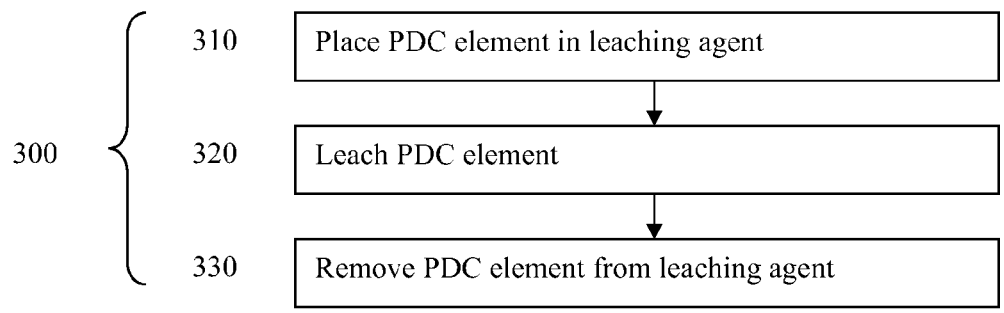
FIG. 5 provides a flow chart of an additional leaching method according to an embodiment of the current disclosure.

As shown in FIG. 5, the disclosure includes a method 300 of leaching a PCD element. First, in step 310, the PDC element is placed in the leaching agent. In this step, the PDC element and a protective system may be first placed in a leaching vessel and then the leaching agent may be added, or the leaching agent may be added to the leaching vessel before the PDC element is placed in the leaching vessel. Furthermore, the PDC element may be placed in a protective system before or after addition to the leaching vessel, but typically will be placed in the protective system prior to its exposure to the leaching agent.

Next, the PDC element is leached in step 320. Leaching may take place over a time span of a few hours to a few months. In particular embodiments, it may take less than one day (24 hours), less than 50 hours, or less than one week. Leaching may be performed at or near room temperature. In a particular embodiment, it may be performed at a temperature of less than 35° C., less than 45° C., or less than 50° C., at a temperature above 10° C., or at a temperature of between 10° C. and 95° C. At temperatures below 95° C., many aqueous leaching agents will not volatilize to the point where a pressure vessel is needed to avoid dispersal of the leaching agent. The duration and conditions of the leaching step may be determined by a variety of factors including, but not limited to, the leaching agent used, the depth to which the PDC element is leached, and the percentage of catalyst to be removed from the leached portion of the PDC element. In various embodiments, the leaching depth may be less than 0.1, mm less than 0.5 mm, less than 1 mm, less than 2 mm, or less than 3 mm. In various embodiments, at least 85%, at least 90%, at least 95%, or at least 99% of the catalyst may be removed to the leaching depth from the leached portion of the PDC element. The leaching depth and amount of catalyst removed may be selected based on the intended use of the PDC element. The leaching process may be aided by stirring the leaching agent or otherwise agitating it, for example by ultrasonic methods, vibrations, or tumbling.

In embodiments where Bronstead acids, such as hydrochloric acid (HCl), nitric acid ($HNO_3$), or aqua regia are employed in combination with a Lewis-acid, the leaching process may still take place at a lower temperature, lower pressure, or both as required to obtain comparable leaching results with the Bronstead acid alone.

In certain embodiments, the leaching agent may be reused from prior leaching steps. In particular, it may be reused up to five or ten times. When the leaching agent has been previously used, the duration of leaching step 320 may be increased.

In step 330, the PDC element and protective system are removed from the leaching agent. This may occur prior to or after removal of the PDC element from the leaching vessel and before or after removal of the leaching agent from the leaching vessel. After removal, the PDC element may optionally be washed, cleaned, or otherwise treated to remove or neutralize residual leaching agent. In a particular embodiment, it may be washed in hot or cold water. The PDC element may also be removed from any protective system during or after its removal from the leaching vessel or even after any washing step. The leaching agent may be removed from the leaching vessel before or after the PDC element is removed. In general, removal steps may be arranged to avoid exposure of any protected portion of the PDC element to leaching agent.

All steps involving manipulation of the PDC element may also be performed by hand or using an automated system, such as a robotic system. Due to the relatively safe nature of many Lewis acids, it may be particularly possible to perform these steps by hand.

Recovery and Recycling Processes

Figure 6:
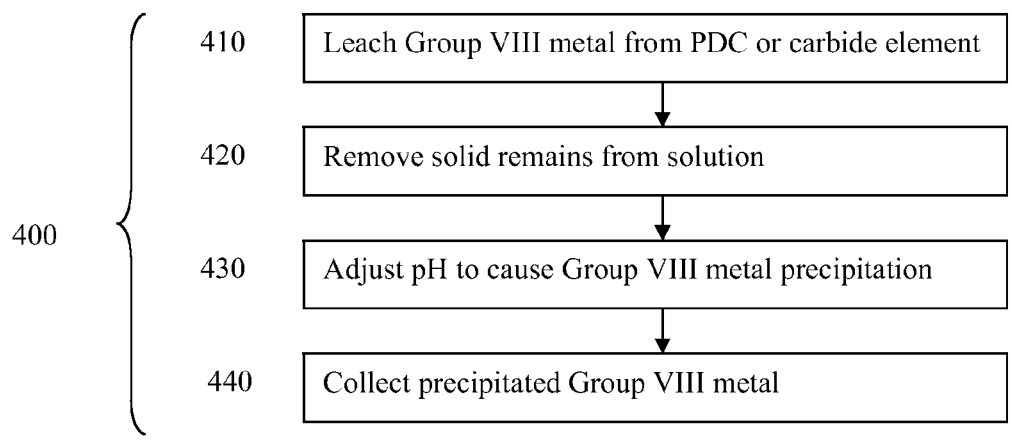
FIG. 6 provides a flow chart of a recycling method according to an embodiment of the current disclosure.
Figure 7A:
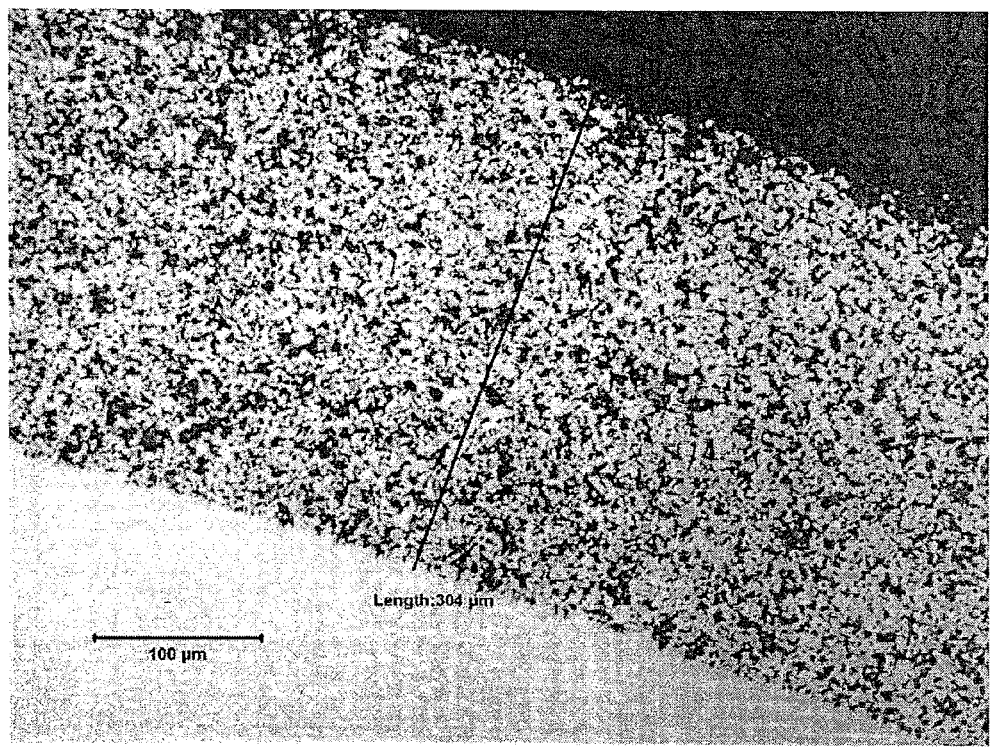
FIGS. 7A-7D each separately provide a photomicrograph of a separate carbide element leached with ferric chloride ($FeCl_3$), according to an embodiment of the current disclosure.
Figure 7B:
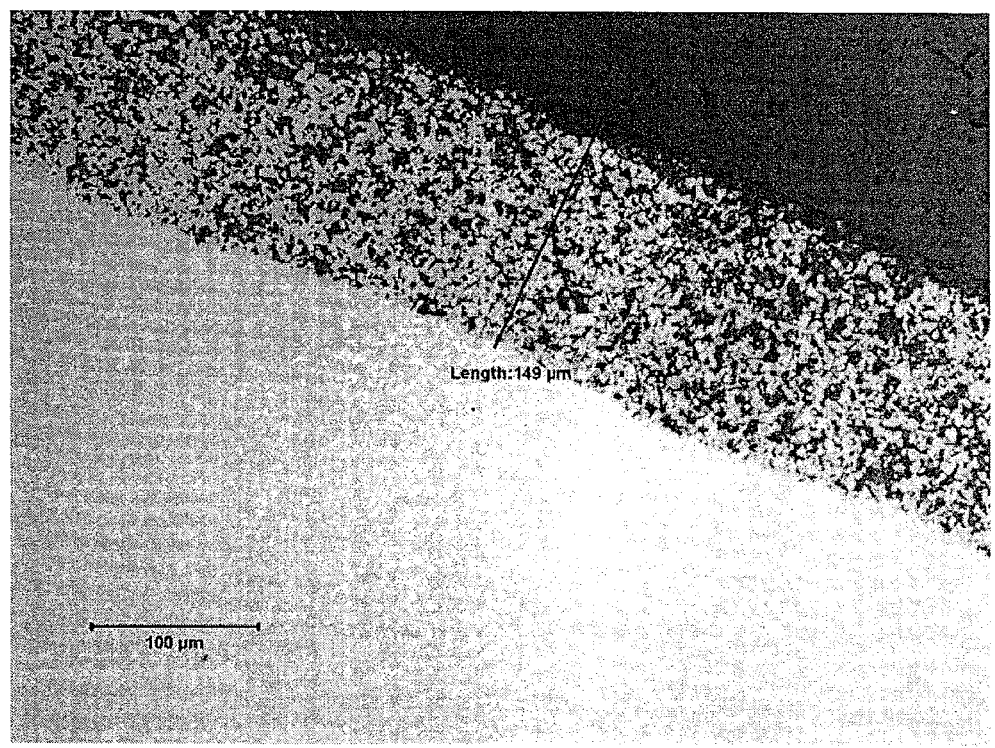
Figure 7C:
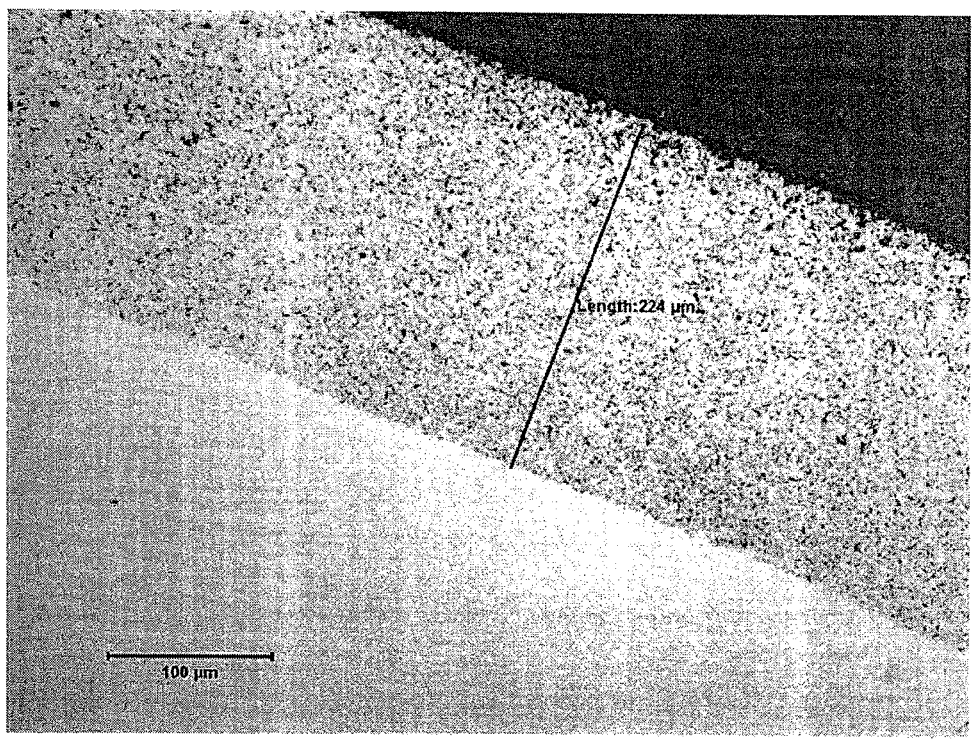
Figure 7D:
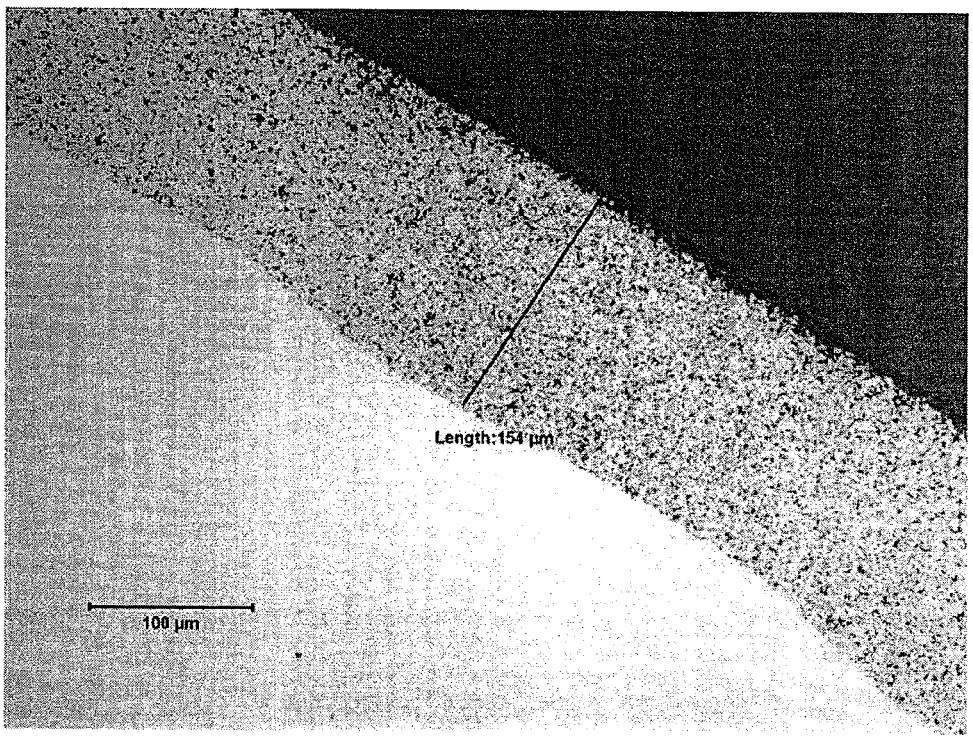
Figure 8A:
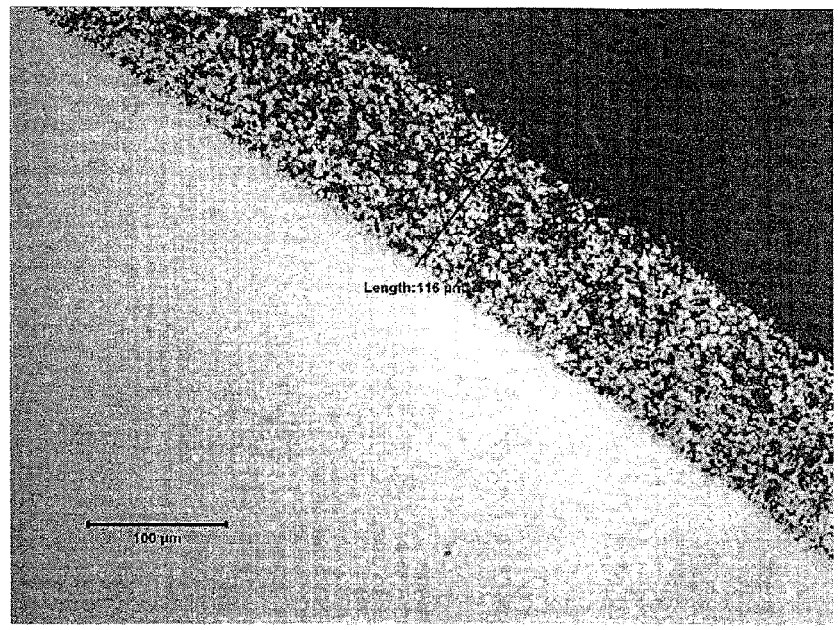
FIGS. 8A-8D each separately provide a photomicrograph of a separate carbide element leached with aqua regia as a comparative example for FIG. 7.
Figure 8B:
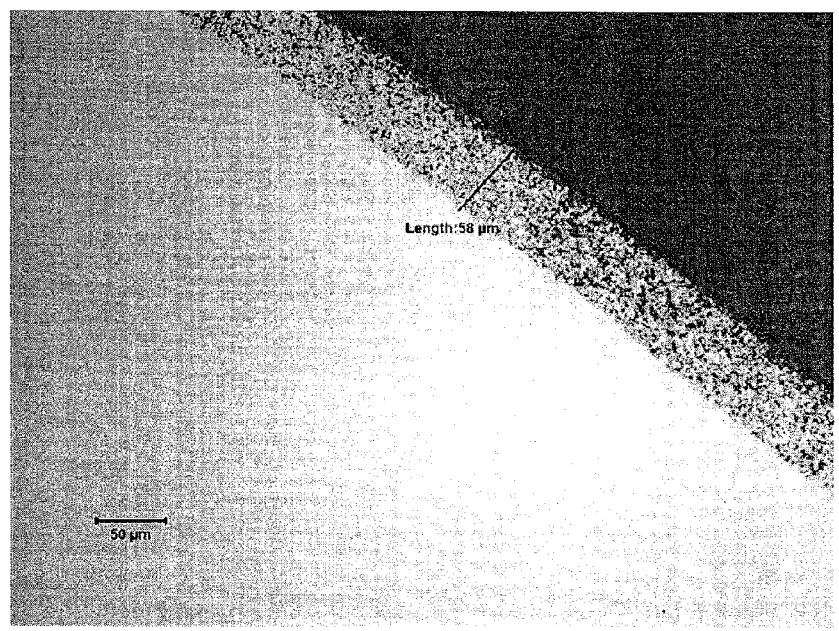
Figure 8C:
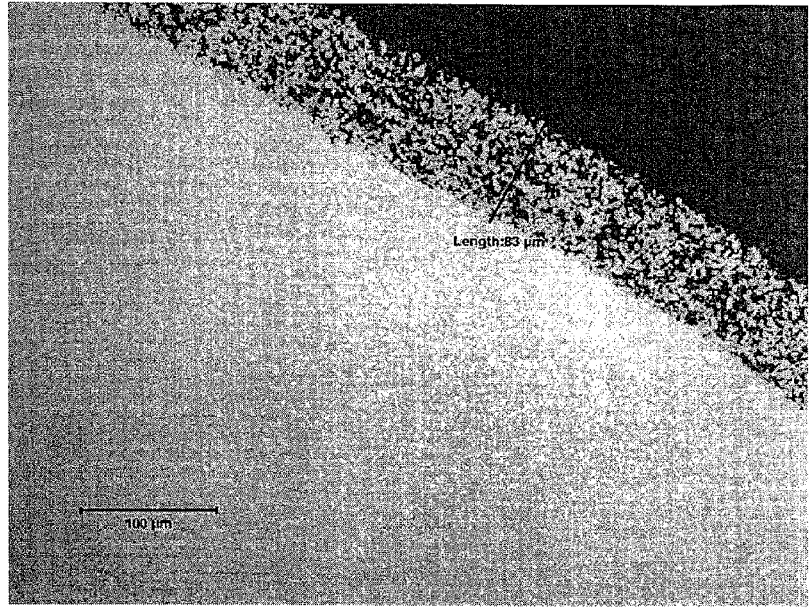
Figure 8D:
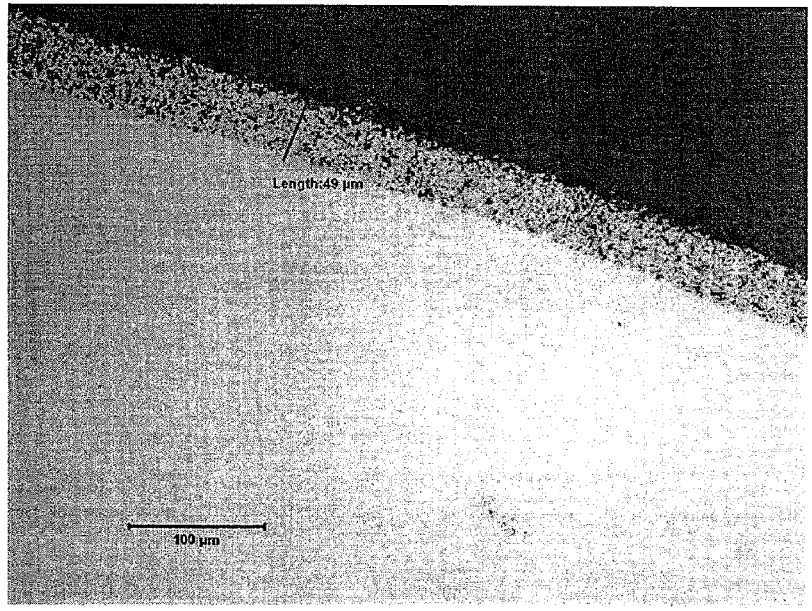
Figure 9A:
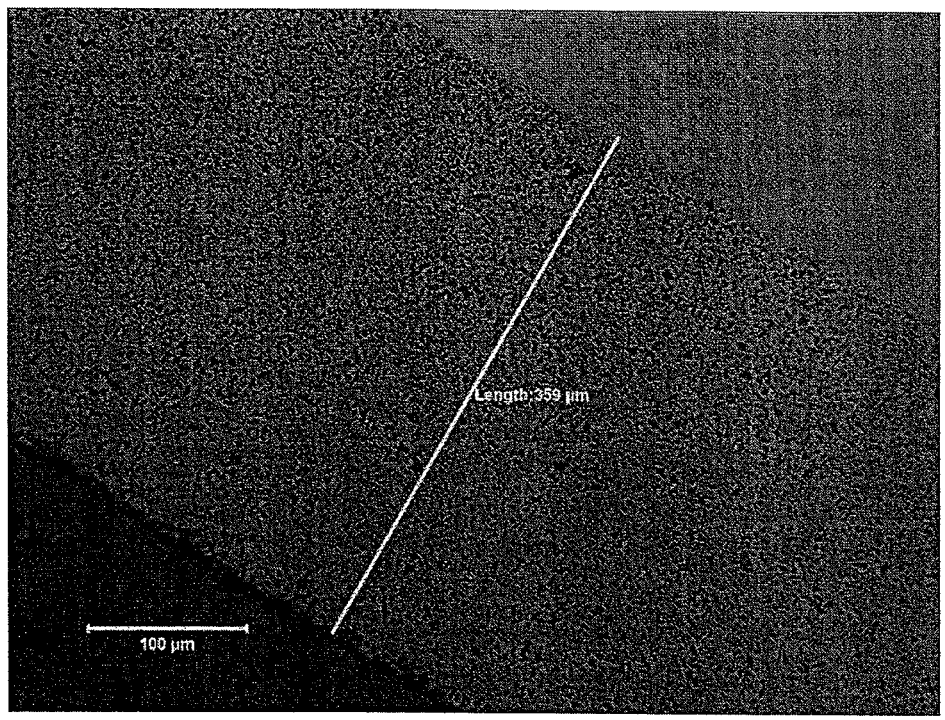
FIGS. 9A and 9B provide photomicrographs of carbide elements leached with ferric chloride ($FeCl_3$), according to an embodiment of the current disclosure.
Figure 9B:
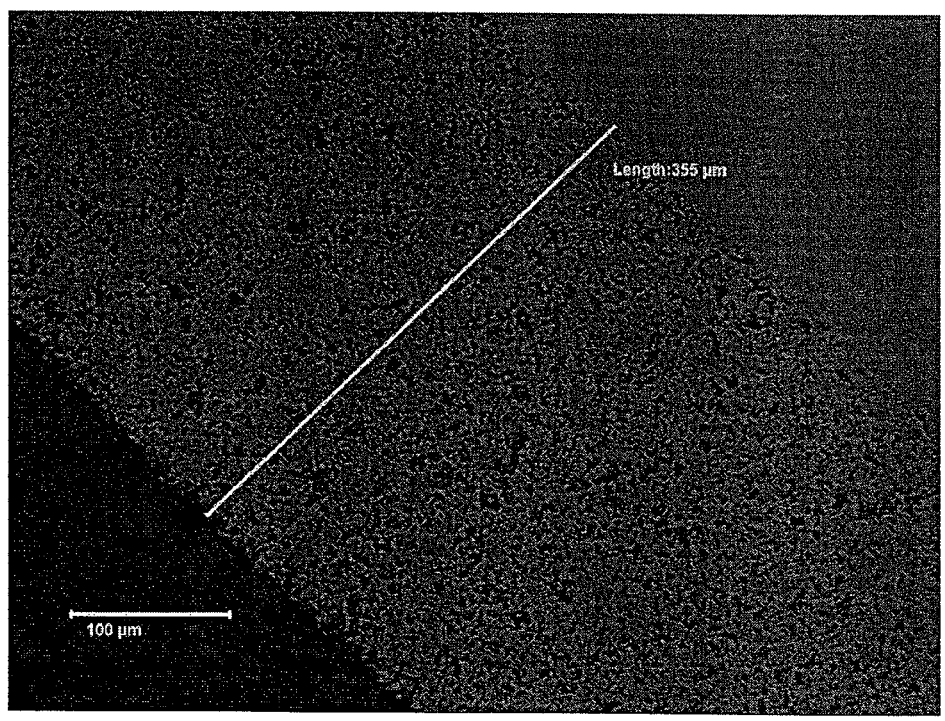
Figure 10A:
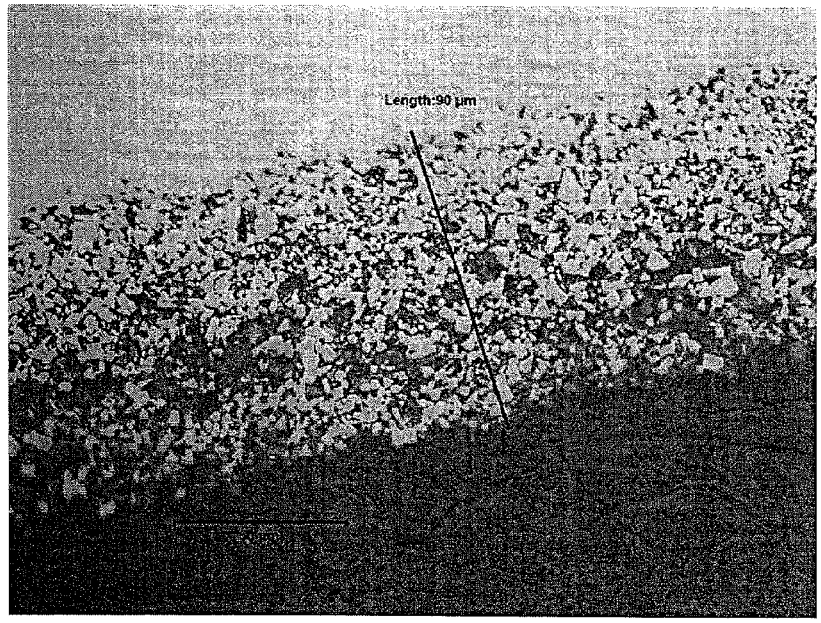
FIGS. 10A and 10B provide a photomicrographs of carbide elements leached with aqua regia as a comparative example to FIG. 9.
Figure 10B:
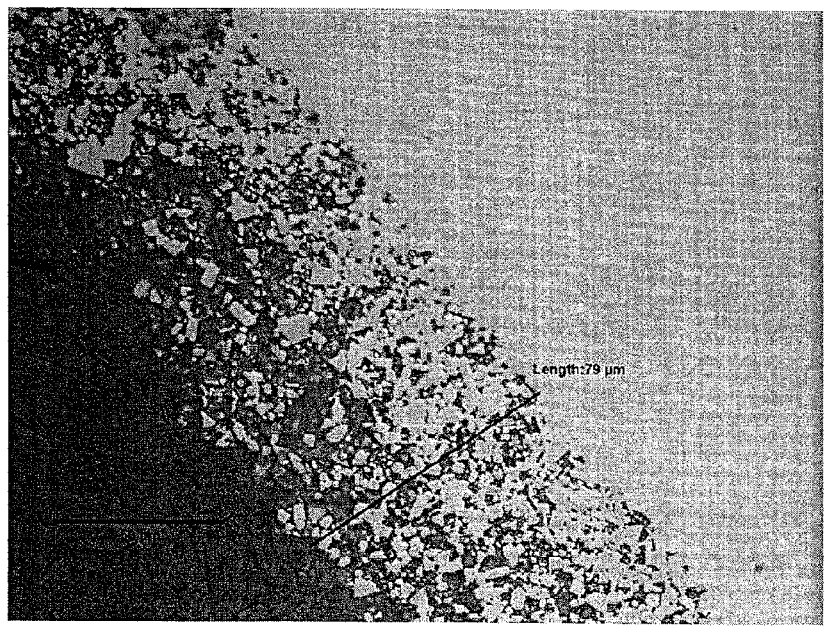
Figure 11A:
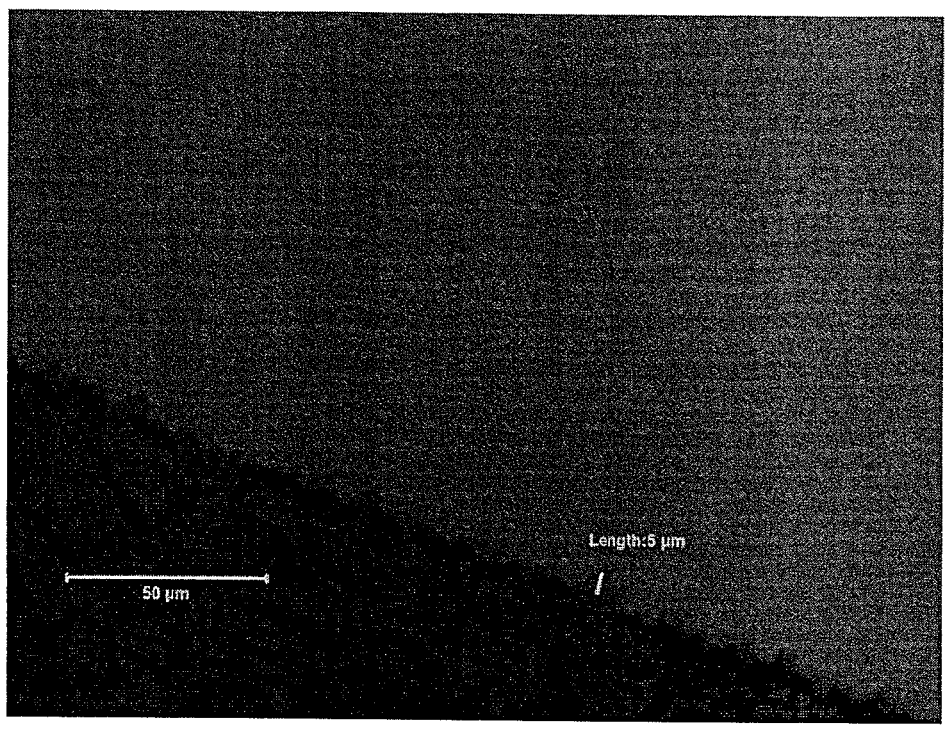
FIGS. 11A and 11B provide photomicrographs of carbide elements leached with aluminum chloride ($AlCl_3$), as a comparative example to FIG. 9.
Figure 11B:
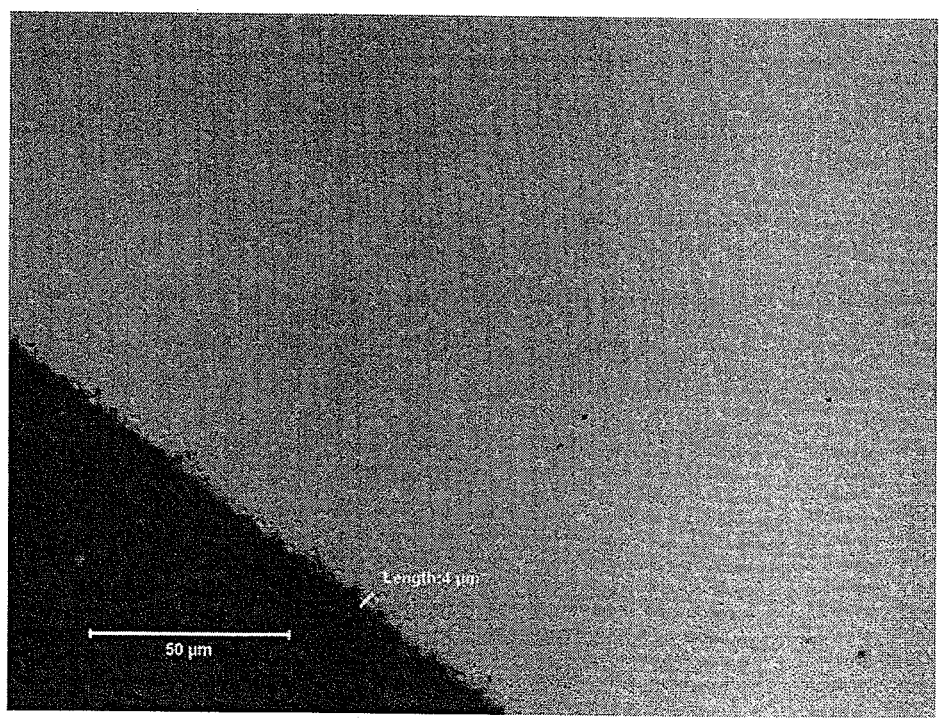
Figure 12A:
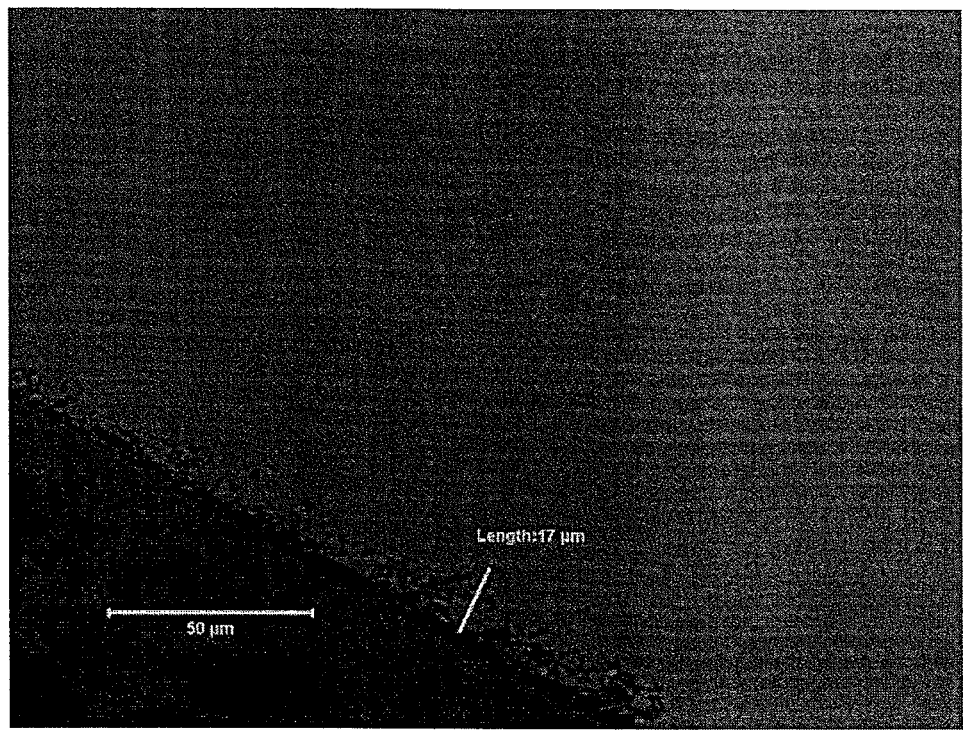
FIGS. 12A and 12B provide photomicrographs of carbide elements leached with fluorosilicic acid ($H_2SiF_6$), as a comparative example to FIG. 9.
Figure 12B:
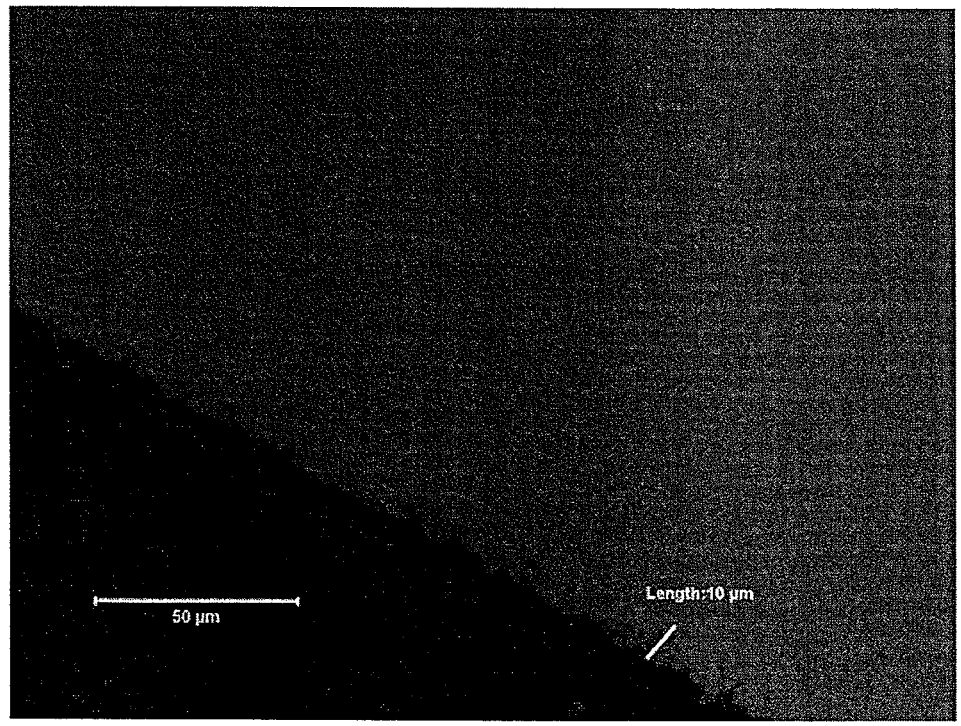

According to a third aspect, the disclosure also provides processes for recovery and recycling of Group VIII metals, such as Cobalt (Co) and Nickel (Ni) and, Iron (Fe) and alloys thereof. According to one process, 400, shown in FIG. 6, a PDC or carbide element to be recycled is placed in a strong Lewis acid, such as a Lewis acid described above as a leaching agent. In one example, the Lewis acid may include a solution of between 0.5 and 50 g ferric chloride in 100 mL water. In step 410, a desired amount of Group VIII metal is leached from the PDC or carbide element. In certain embodiments, the desired amount may be at least 90%, at least 95%, or at least 99% or the Group VIII metal. In step 420, the Lewis acid/Group VIII metal solution is removed from any solid remains of the PDC or carbide element. In step 430, the pH is adjusted to cause the Group VIII metal to precipitate from the Lewis acid/Group VIII metal solution. For example, in a solution of ferric chloride and cobalt, if the solution pH is adjusted to around pH 7 or higher, the cobalt will precipitate. Finally, in step 440, the precipitated Group VIII metal is collected.

In certain embodiments, the Lewis acid may be reused again in the same process. In other embodiments it may be a leaching agent that has already been used for leaching. In these embodiments, the leaching agent may not perform as well in leaching as unused leaching agent, but may still work sufficiently well for a recovery process, which may have less stringent process parameters. For example, a recovery process may require more time than is acceptable for a leaching process. These embodiments provide the added benefit of allowing further use of used leaching agents before they are disposed of, limiting waste and controlling cost.

Process parameters, such as temperature, concentration and identity of the Lewis acid, process duration, pH used to precipitate the Group VIII metal, and processes for collection of the precipitated metal may vary depending on the metal to be recovered and the properties, such as size, of the PDC or carbide element to be recycled.

In some embodiments, the process parameters for the leaching step of the recovery process may be the same as or similar to the process parameters described above for leaching. For example, the leaching step of the recovery process may take place over a time span of a few hours to a few months. In particular embodiments, it may take less than one day (24 hours), less than 50 hours, or less than one week. However, due to less stringent economic constraints or other factors, it may be acceptable for the leaching step of a recovery process to take longer than the leaching step for leaching a PDC. For instance, the leaching step may take as long as six months.

Leaching in the recovery process may be performed at or near room temperature. In a particular embodiment, it may be performed at a temperature of less than 35° C., less than 45° C., or less than 50° C., at a temperature above 10° C., or at a temperature of between 10° C. and 95° C. At temperatures below 95° C., many aqueous leaching agents will not volatilize to the point where a pressure vessel is needed to avoid dispersal of the leaching agent. Temperature control of leaching during recovery processes may be less important than during leaching of PDCs.

In some embodiments, the leaching part of the recovery process may be aided by stirring the leaching agent or otherwise agitating it, for example by ultrasonic methods, vibrations, or tumbling.

In general, the parameters of the leaching part of the recovery process may be governed by a variety of factors, such as the amount of Group VII metal to be removed, cost of leaching agents and operation of process control devices, and space occupied by the leaching process.

In embodiments where Bronstead acids, such as hydrochloric acid (HCl), nitric acid ($HNO_3$), or aqua regia are employed in combination with a Lewis-acid, the leaching process may still take place at a lower temperature, lower pressure, or both as required to obtain comparable leaching results with the Bronstead acid alone.

All steps involving manipulation of the PDC or carbide element may be performed by hand or using an automated system, such as a robotic system. Due to the relatively safe nature of many Lewis acids, it may be particularly possible to perform these steps by hand.

Particularly in embodiments where Cobalt or Nickel are recycled and recovered, protective measures may be taken to avoid human exposure to toxic levels of these metals.

In certain embodiments, after the Group VIII metal is collected, the pH of the leaching agent may be readjusted to a pH suitable for leaching a Group VIII metal from a PDC or carbide element. For example, it may be readjusted to the original pH it had before the recovery process was performed.

In still another embodiment, a shortened version of the process may be used to recover metals from a Lewis acid-based leaching agent. In this embodiment, the pH of the leaching agent, after leaching, may be adjusted to cause Group VIII metals found in the leaching agent to precipitate. These metals may then be collected.

Example PDC or carbide elements for the process may be used to recover and recycle metals include, but not limited to cemented carbide products including rotary bur blanks, carbide disc cutters, inserts incorporated in drill bits for mines and oil field, drawing die blanks, rods, strips, clamped inserts, turnover knives, profile knives, end mills, or any other products produced by Kennametal Inc., Sandvik AB, Yueqing Jinfeng Cemented Carbide Co., Ltd. or other similar companies. The process may also be used to recovery and recycle metals from any product produced by the infiltration or hot-pressing of matrix bodies incorporating hard metals captured in a metal alloy of a lower melting temperature.

EXAMPLES

The following examples are provided to further illustrate certain embodiments of the invention. They are not intended to limit the invention to the components, compositions, systems, techniques, or methods described in these examples.

Example 1

Techniques Used to Evaluate Effectiveness of Leaching Agents and Protective Systems The location and amount of leaching in a PDC element may be determined using any of a variety of techniques including, but not limited to: a) digital real-time radioscopy, which may determine leaching depth and PDC integrity in a non-destructive manner, b) micro-examination of polished or fractured surfaces using optical or scanning electron microscopes or using a micro-hardness test, which may determine leaching depth, position of the leached region, and integrity of the PDC, which may be destructive or non-destructive c) density tests, which indicate loss of Cobalt as density decreases, magnetic saturation, which indicates loss of Cobalt as this property decreases and d) coercivity, which indicates loss of Cobalt as this property increases. Testing may be destructive or non-destructive. These techniques may be used in conjunction with the present disclosure to determine the effectiveness of potential leaching agents and protective systems as well as the parameters of methods using leaching agents and protective systems to obtain desired amounts of leaching or the parameters of recovery and recycling methods.

Example 2

Carbide Insert Comparison of Ferric Chloride and Aqua Regia Leaching Agents and Determination of Influence of Grain Size and Reuse of Reagents on Leaching The destructive effects of leaching agents on tungsten carbide substrates are largely due to the ability of leaching agents to remove Group VIII metals, such as Co, Fe and Ni and alloys thereof from the tungsten carbide much more quickly than they are removed from PDC. As a result, tungsten carbide containing Group VIII metals provides a good model for short duration, lower cost tests of potential leaching agents. The tests performed in the Example 2 were therefore conducted using cobalt cemented tungsten carbide inserts.

In these tests, eight inserts were subjected to test conditions in which either the leaching agent, grain size of the carbide, or fresh vs. reused condition of the leaching agent was varied. The leaching agent was either aqua regia (1 part nitric acid+3 parts hydrochloric acid) or ferric chloride (6 g ferric chloride in 100 mL water). The carbide grade (grain size/cobalt content) was either grade 612 or grade 410. The reagent was either freshly prepared, or had previously been used to leach at least one tungsten carbide insert.

The carbide inserts were then leached for 3 hours at room temperature, washed to remove the leaching reagent, removed from the PTFE masks, then cut ground and polished. Leaching depth was determined at a magnification of 200×. Leaching depths for the various test conditions are summarized in Table 1.

TABLE 1

Leaching Depth

| Leaching Reagent | Carbide Grade (Grain size/cobalt content) | Fresh or Used Reagent | Leaching depth (microns) |
|---|---|---|---|
| $FeCl_3$ | 612 | Fresh | 304 |
| $FeCl_3$ | 612 | Used | 149 |
| $FeCl_3$ | 410 | Fresh | 224 |
| Aqua regia | 612 | Fresh | 116 |
| $FeCl_3$ | 410 | Used | 154 |
| Aqua regia | 410 | Fresh | 58 |
| Aqua regia | 612 | Used | 83 |
| Aqua regia | 410 | Used | 49 |

Micrographs of the carbide inserts showing leaching depths are also provided in FIGS. 7A-D (ferric chloride) and FIGS. 8A-D (aqua regia).

Use of ferric chloride as a leaching agent, regardless of the other conditions, resulted in an increased leaching depth of 131 microns on average, nearly three times as deep, as compared to aqua regia, regardless of the other conditions. This indicates that ferric chloride is a more effective leaching agent than aqua regia at room temperature.

Use of a larger grain size, regardless of the other conditions, resulted in an increased leaching depth of 42 microns on average. This is likely a result of an increased ability of the leaching reagent to penetrate the carbide insert when grain sizes are larger.

Use of a fresh versus used reagent, regardless of other conditions, resulted in an increased leaching depth of 67 microns on average. Similarly, looking at aqua regia or ferric chloride separately, a decrease in leaching depth is seen when employing used leaching agent. Although fresh leaching agent appears preferable, in both instances, leaching agent may be reused with adjustments in leaching time.

Example 3

PDC Comparison of Ferric Chloride and Aqua Regia Leaching Agents and Determination of Influence of Grain Size and Leaching Duration The ability of ferric chloride or aqua regia prepared as described in Example 2 to leach actual PDC element was tested using various PDC element with different diamond grain sizes. The PDC elements were placed in a PTFE mask as described herein to further test the ability of the mask to protect the inserts. The interior cavity of the mask used generally conformed to the shape of the insert and, at the contact band, the difference between the inner diameter of the interior cavity and the outer diameter of the carbide insert was between negative 7.62 microns to positive 91.44 microns. The PDC elements were then leached at room temperature for either 6 hours or 12 hours. The decrease in density, magnetic saturation, and increase in coercivity, which indicates leaching, was measured for each sample. Results for ferric chloride are presented in Table 2. Results for aqua regia are presented in Table 3.

TABLE 2

Ferric Chloride Effects on Density, Magnetic Saturation, and Coercivity

| Grain Size | Leaching time | Density % Decrease | Magnetic Saturation % Decrease | Coercivity % Increase |
|---|---|---|---|---|
| Coarse | 12 hours | 0.08 | 0.22 | 0.09 |
| Coarse | 6 hours | 0.162 | 0.11 | 0.045 |
| Fine | 12 hours | 0.229 | 0.37 | 0.76 |
| Fine | 6 hours | 0.076 | 0.12 | −0.2 |

TABLE 3

Aqua Regia Effects on Density, Magnetic Saturation, and Coercivity

| Grain Size | Leaching time | Density % Decrease | Magnetic Saturation % Decrease | Coercivity % Increase |
|---|---|---|---|---|
| Coarse | 12 hours | 0.24 | 0.22 | −0.33 |
| Coarse | 6 hours | 0.081 | −0.11 | −0.04 |
| Fine | 12 hours | 0 | 0.24 | 0.04 |
| Fine | 6 hours | 0.076 | 0 | 0.25 |

These data overall show that ferric chloride depleted cobalt the most in a fine grain PDC when it was leached for 12 hours. Ferric chloride depleted cobalt the least in a fine grain PDC when it was leached for 6 hours. Ferric chloride was able to deplete more cobalt from a coarse grain PDC after only 6 hours of leaching than in a fine grain PDC after 12 hours. Accordingly, grain size is likely an important factor in the leaching parameters for PDCs when using a ferric chloride reagent, but ferric chloride was able to measurably deplete cobalt from fine grain PDCs. In contrast, although aqua regia was able to leach coarse grain PDCs more effectively than ferric chloride, it was less effective in leaching fine grain PDCs, showing a similar change after 6 hours, but no further change at 12 hours. Accordingly, ferric chloride may be a superior leaching agent for fine grain PDCs at room temperature.

Example 4

Testing of Additional Lewis Acids

To determine the ability of additional Lewis acids to leach Cobalt from tungsten carbide cutters, Grade 510 10% Co cutters were leached at room temperature in one of four leaching agents for three hours. Two cutters were leached per agent to provide comparative results. The leaching agents were a) aqua regia (1 part nitric acid+3 parts hydrochloric acid), b) ferric chloride (10 g ferric chloride in 100 mL water), c) aluminum chloride (10 g aluminum chloride in 100 mL water, or d) fluorosilicic acid (100 g fluorosilicic acid in 100 mL water). Results (averaged between two samples, which in each instance provided similar results) are provided in Table 4.

TABLE 4

Leaching with Additional Lewis Acids

| Agent | Density % Decrease | Magnetic Saturation % Decrease | Coercivity % Increase | Leaching depth (microns) |
|---|---|---|---|---|
| Ferric Chloride | 0.034 | 14.339 | 4.043 | 357 |
| Aqua Regia | 0.034 | 2.887 | 2.371 | 85 |

TABLE 4-continued

Leaching with Additional Lewis Acids

| Agent | Density % Decrease | Magnetic Saturation % Decrease | Coercivity % Increase | Leaching depth (microns) |
|---|---|---|---|---|
| Aluminum Chloride | −0.034 | 0.000 | −2.490 | 5 |
| Fluorosilicic Acid | 0.034 | 0.000 | −1.004 | 14 |

For ferric chloride and aqua regia, leaching depths were similar to those observed in Example 2, with ferric chloride showing much greater leaching depths than aqua regia. Neither aluminum chloride nor fluorosilicic acid were successful leaching agents under the conditions tested, indicating that not all strong Lewis acids are suitable leaching agents. Photomicrographs of the leached cutters are shown in FIGS. 9, 10, 11 and 12.

Decreases in magnetic density and magnetic saturation and an increase in coercivity were observed when ferric chloride and aqua regia were used as leaching agents. The magnitude of change in magnetic saturation and coercivity was much greater than in Example 3, consistent with the use of tungsten carbide cutters in this example and PDC cutters in Example 3. As measured by these parameters, aluminum chloride and fluorosilicic acids were also not suitable leaching agents under the conditions used.

Example 5

Combination Leaching Agents

Combinations of Lewis acids and Bronstead acids at low temperature, low pressure leaching agents were further explored.

Figure 13A:
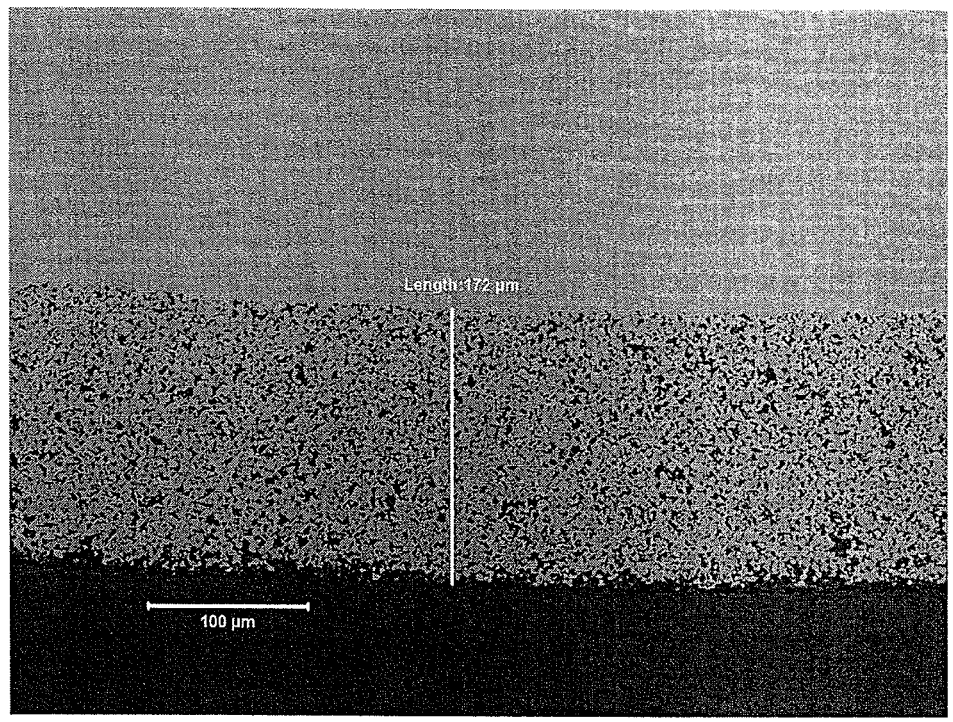
FIG. 13A provides a photomicrograph of a carbide element leached with a combination of hydrochloric acid and cupric chloride.
Figure 13:
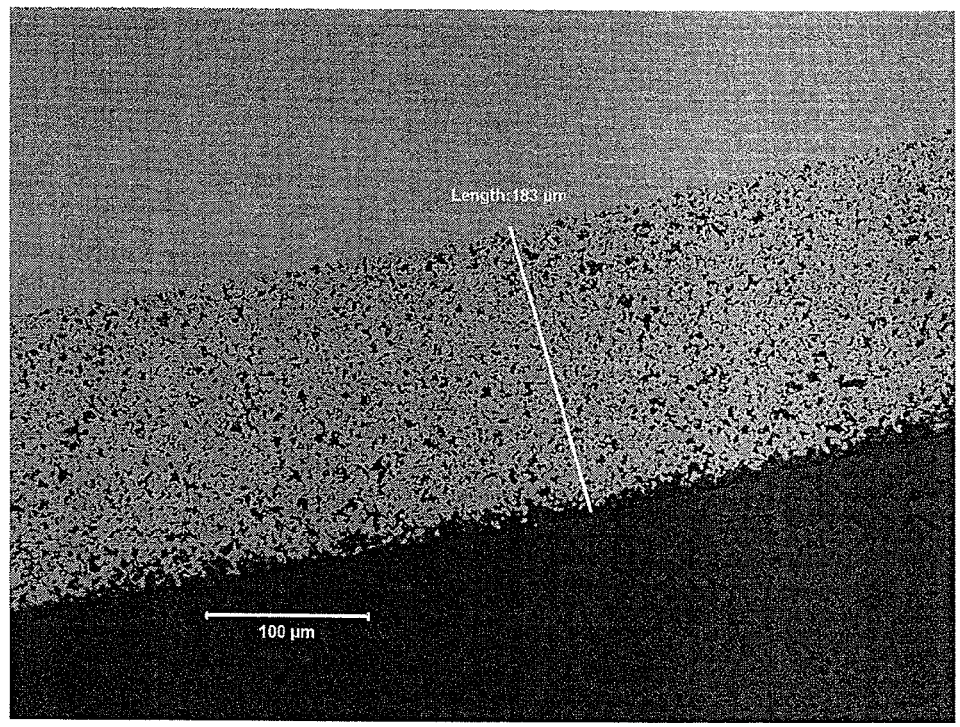
FIG. 13B provides a photomicrograph of a carbide element leached with a combination of hydrochloric acid and ferric chloride.

The relatively weak Lewis acid, cupric chloride, was combined with hydrochloric acid and used to leach a Grade 510 10% Cobalt tungsten carbide cutter at room temperature for 3 hours. The leaching agent contained 10 g $CuCl_2$ in 100 mL $H_2O$ and 25 mL HCl. Results are shown in FIG. 13A. The cutter was leached to a depth of 172 microns. As a comparison, the same type of cutter was also leached under the same conditions using a solution of 10 g $FeCl_3$ in 100 mL $H_2O$ and 25 mL HCl. Results are shown in FIG. 13B. The cutter was leached to a depth of 183 microns.

Overall, these results show that strong Lewis acids, such as ferric chloride, able to leach well on their own may not benefit from the addition of a Bronstead acid. Ferric chloride alone, as shown in Table 4, was able to leach an identical cuter under identical conditions to a depth of 304 microns, as opposed to the depth of 183 microns obtained when hydrochloric acid was added.

The results also show, however, that weak Lewis acids, such as cupric chloride, may benefit from the addition of a Bronstead acid and, in combination with the Bronstead acid, form a leaching agent suitable for use under low temperature and low pressure conditions.

Figure 14:
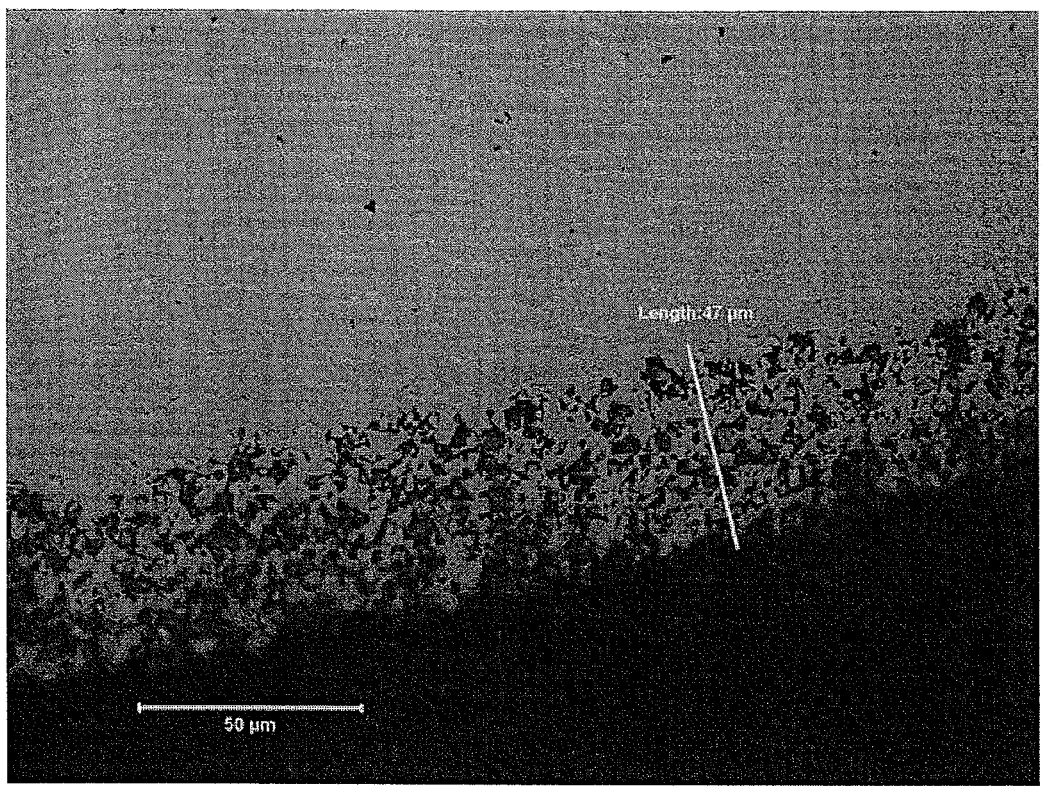
FIG. 14 provides a photomicrograph of a carbide element leached with a combination of aqua regia and ferric chloride, according to an embodiment of the current disclosure.

To further explore combinations of Lewis acids and Bronstead acids, ferric chloride was combined with aqua regia and used to leach a 510 Grade 10% Cobalt tungsten carbide cutter for three hours at room temperature. The leaching agent contained 20 g $FeCl_3$ in 100 ml HCl, 20 ml $HNO_3$, and 100 ml $H_2O$. Results are show in FIG. 14. Leaching depth was only 47 microns, thus, when compared to the data presented in Table 4, indicating that ferric chloride exhibits superior performance when used alone instead of combined with aqua regia under the conditions tested.

Although only exemplary embodiments of the invention are specifically described above, it will be appreciated that modifications and variations of these examples are possible without departing from the spirit and intended scope of the invention. For example, in the specification particular measurements are given. It would be understood by one of ordinary skill in the art that in many instances other values similar to, but not exactly the same as the given measurements may be equivalent and may also be encompassed by the present invention. As another example, one of ordinary skill in the art will recognize that certain non-Group VIII catalysts may be leached using the systems, agents and methods described herein. Furthermore, one of ordinary skill in the art will recognize that the systems, agents and method described herein may be used with PDCs made of either natural or synthetic diamond, or both.

The invention claimed is:

1. A method of leaching a polycrystalline diamond compact (PDC) element, the method comprising:
    placing a PDC element containing a metal comprising Fe, Co, Ni, alloys thereof, or a mixture thereof, and a protective system protecting a non-leached portion of the PDC element in a Lewis acid-based leaching agent selected from the group consisting of ferric chloride ($FeCl_3$), cupric chloride ($CuCl_2$), solutions thereof, and combinations thereof; and
    leaching the metal from the PDC element to a leaching depth.

2. The method according to claim 1, wherein the PDC element comprises a cutter for an earth-boring drill bit.

3. The method according to claim 1, where the leaching agent comprises a solution of 0.5 to 50 g ferric chloride in 100 mL water.

4. The method according to claim 3, wherein the leaching agent further comprises up to 50% hydrochloric acid by volume.

5. The method according to claim 3, wherein the leaching agent further comprises up to 50% by volume nitric acid.

6. The method according to claim 3, wherein the leaching agent further comprises up to 50% by volume aqua regia.

7. The method according to claim 1, wherein leaching the metal from the PDC element to a leaching depth is performed at a temperature of less than 50° C.

8. The method according to claim 1, wherein leaching the metal from the PDC element to a leaching depth is performed at a temperature between 10° C. and 95° C.

9. The method according to claim 1, wherein the leaching depth is less than 3 mm.

10. The method according to claim 1, wherein at least 85% of the metal is leached from the PDC up to the leaching depth.

11. The method according to claim 1, wherein leaching the metal from the PDC element to a leaching depth occurs in a leaching vessel, further comprising removing the PDC element and protective system from the leaching vessel.

12. The method according to claim 1, further comprising washing, cleansing, or treating the PDC element to neutralize or remove the leaching agent.

13. The method according to claim 1, further comprising removing the PDC element from the protective system.

14. A method of leaching a polycrystalline diamond compact (PDC) element, the method comprising:
    placing a PDC element containing a metal comprising Fe, Co, Ni, alloys thereof, or a mixture thereof, and a protective system protecting a non-leached portion of the PDC element in a Lewis acid-based leaching agent comprising $CuCl_2$ and hydrochloric acid; and
    leaching the metal from the PDC element to a leaching depth.

15. A method of leaching a polycrystalline diamond compact (PDC) element, the method comprising:
    placing a PDC element containing a metal comprising Fe, Co, Ni, alloys thereof, or a mixture thereof, and a protective system protecting a non-leached portion of the PDC element in a Lewis acid-based leaching agent selected from the group consisting of ferric chloride ($FeCl_3$), cupric chloride ($CuCl_2$), solutions thereof, and combinations thereof;
    leaching the metal from the PDC element to a leaching depth; and
    repeating the placing and leaching the metal from the PDC element to a leaching depth steps between five to ten time while reusing the leaching agent.

16. The method according to claim 1, further comprising stirring or agitating the leaching agent during leaching the metal from the PDC element to a leaching depth.

* * * * *